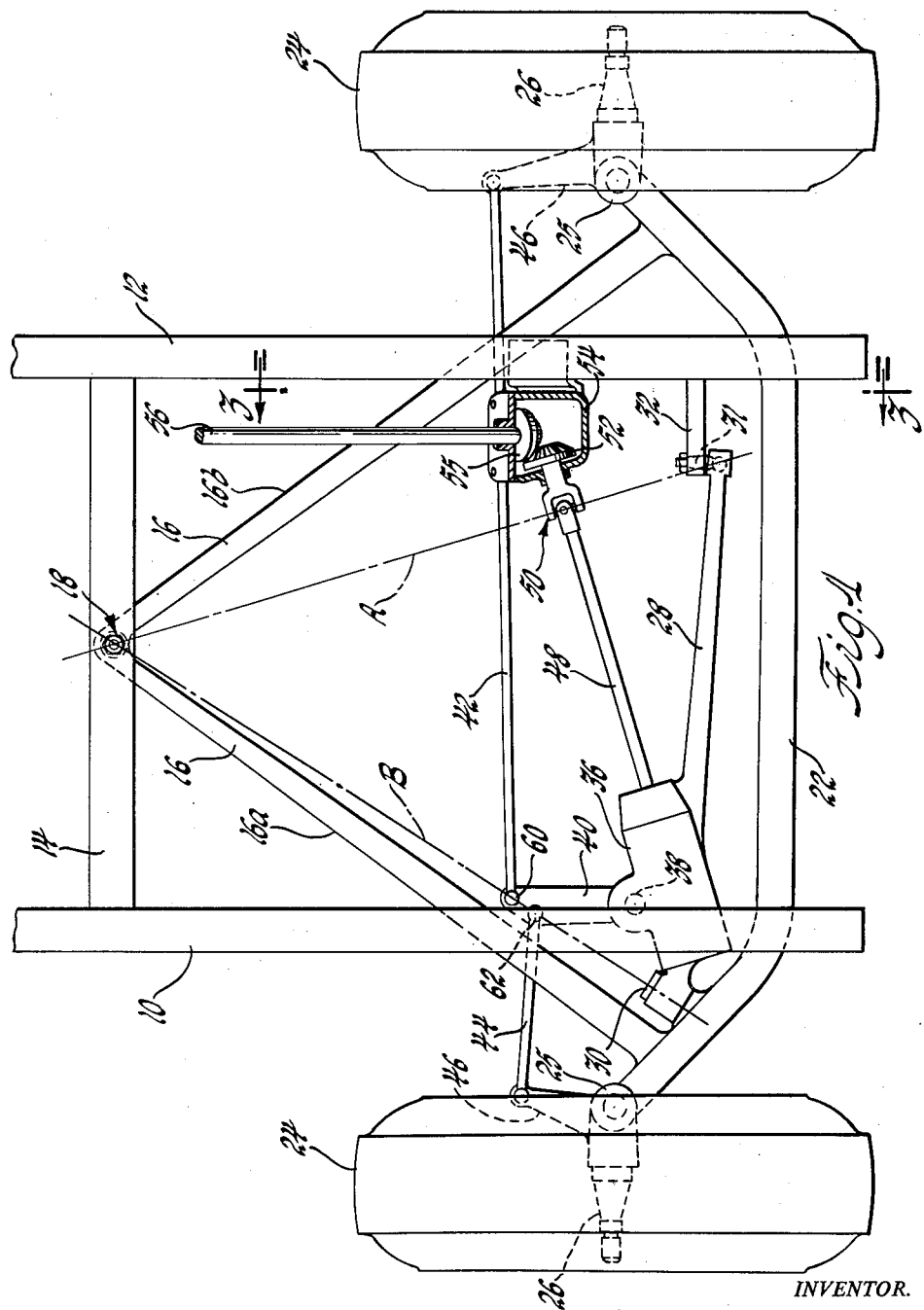

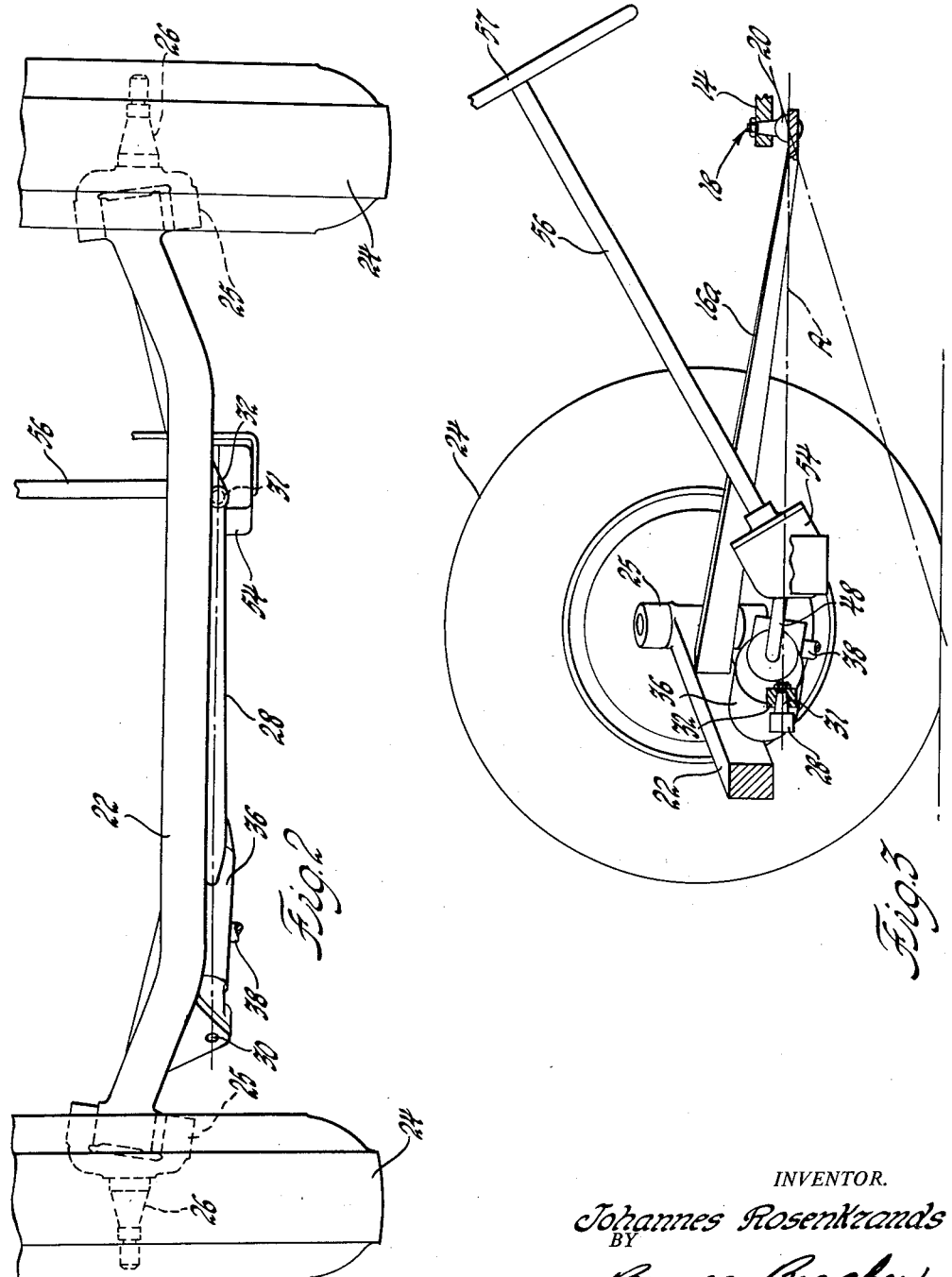

United States Patent Office 3,020,060
Patented Feb. 6, 1962

3,020,060
STEERING ARRANGEMENT FOR A SOLID FRONT AXLE SUSPENSION
Johannes Rosenkrands, Detroit, Mich., assignor to General Motors Corporation, Detroit, Mich., a corporation of Delaware
Filed July 13, 1960, Ser. No. 42,709
2 Claims. (Cl. 280—95)

This invention relates to a suspension-steering system for automotive vehicles and more particularly concerns a suspension-steering system of the type incorporating a so-called "solid front axle," a term applied to distinguish constructions in which the dirigible wheels are independently sprung.

It has been known heretofore to interconnect a solid front axle and a frame cross member through a pair of arms having a common universal connection with the frame cross bar centrally of the length thereof. These arms extend forwardly and divergingly from the point of such universal connection to spaced points on the axle to which the arms are fixedly connected. To control lateral displacements of the arms a radius rod linked thereto and reacted by the vehicle frame is commonly employed. It has been found, however, that a system as described when used with conventionally located steering components is prone to give rise to wheel shimmy or flutter.

The present invention has as its principal object to provide a steering-suspension system of the above general type which covercomes the indicated problem.

Other objects and features of the invention will be apparent from the following description which will proceed with reference to the accompanying drawings wherein:

FIGURE 1 is a generally diagrammatic plan view showing the front portion of a vehicle chassis incorporating the invention;

FIGURE 2 is a front elevation; and

FIGURE 3 is a view on the line 3—3 in FIGURE 1.

In the drawings, the numerals 10 and 12 denote the side rail components of the vehicle frame, these being interconnected by a cross frame member 14. A V-frame assembly 16 has a universal connection with the cross piece 14. Such connection utilizes a ball stud 20 (FIG. 3) accommodated in a seat formed in the cross piece centrally of its length.

The arms 16a and 16b of the V-frame assembly have fixed connection with an axle 22 disposed under the side rails 10 and 12. Dirigible wheels 24 turn on spindles 26 pivotally connected to the axle 22 through steering knuckles 25.

Disposed generally transverse the vehicle is a radius rod 28 controlling lateral displacements of the V-frame assembly and axle. This rod is connected to the axle through a pin-type joint, the pin 30 being shown as fixed to the axle and as extending through an eye at the end of the radius rod. Such rod at its other end is formed to accommodate a ball stud 31 connected to the side rail 12 by means of a bracket support 32.

Any suitable type of spring may be interposed between the axle and vehicle frame.

A steering gear box 36 is to be noted as fixedly mounted on the radius rod 28. The output shaft 38 (FIG. 3) is splined or otherwise suitably connected to a pitman arm 40 through which the steering linkage comprising rods 42 and 44 is actuated. Each of these rods is linked at its outer end to a steeering knuckle arm 46 fixedly connected to the corresponding knuckle 25.

The input to the gear box 36 is a shaft 48 which extends from a universal joint 50. The driving component of such joint has connection with a bevel gear 52 housed within a casing or box 54 supported by the frame rail member 12. Gear 52 will be seen as mating with a bevel gear 55 at the end of a steering shaft 56, shown in FIGURE 3 as carrying the usual steering wheel 57.

In accordance with the invention, the axis of each of the U-joint pins (50) as the shaft 48 rotates assumes a position coincident with a line A intersecting the axes of the universal connection 18 and the pivotal connection 31. Also in conformance with the invention, it is essential that with the dirigible wheels 24 in their centered or straight-ahead position the axis of the pin 30 be located on a line B intersecting the axis of the universal connection 18 and the axes of the joints 60 and 62 whereby the pitman arm 40 is connected to the links 42 and 44 respectively.

Mention should be made of the fact that the invention is not limited to any particular type of steering linkage, that shown being merely by way of illustration. It is only necessary that the connection or connections at the end of the pitman arm 40 be located as above described, that is on a line representing the axis of the pin 30 and intersecting the axis of the universal connection 18. With this condition, and with the steeering wheel held in straight-ahead position, the connections at the end of the pitman arm will remain in an invariable relationship with the front axle and, consequently, also with the dirigible wheels for any axle and wheel motion in the vertical direction.

Any lateral flexibility which may be considered desirable in the suspension may be had by the simple expedient of a sliding joint either in the shaft 48 or the universal 50. The inclusion of such a joint will in no way affect the accuracy of the steering.

I claim:

1. In a suspension-steering system for a self-propelled vehicle, an axle under the frame of the vehicle having dirigible means pivotally connected thereto at either end thereof, steering linkage means operably connected to said dirigible means, a generally horizontally disposed V-frame member having its legs fixedly connected to said axle in inwardly spaced relation with respect to said dirigible means, said V-frame member being supported by the vehicle frame through a universal connection located at the vertex of the V substantially on the center line of the vehicle, a radius rod having pivotal connection with the frame of the vehicle at one side thereof and extending toward the other side of the vehicle where it has pivotal connection with said axle through a pin type joint, a gear box mounted on said radius rod inward of said pin joint, means actuated by the output of said gear box having connection with said linkage at a point such that when said dirigible means are in centered relation the connection is located on a line representing the axis of said pin joint and intersecting the axis of said universal connection, and transverse shaft means inputing to said gear box comprising a universal joint located on a line intersecting the axis of the connection between said radius rod and the vehicle frame at the said one side of the vehicle and the axis of said universal connection.

2. In a suspension-steering system for a vehicle having frame side rails and a cross member interconnecting said rails, an axle under said rails having a road wheel pivotally connected thereto at either end thereof, a steering linkage operably connected to said wheels, a generally horizontally disposed V-frame member having its legs fixedly connected to said axle near said wheels, said V-frame member being supported by the vehicle frame through a universal connection located at the vertex of the V centrally of the length of said cross member, a radius rod having pivotal connection with one of said rails and extending toward the other of said rails where it has pivotal connection with said axle through a pin type joint, a gear box mounted on said radius rod just inward of said pin joint, a pitman arm connected to the output component of said gear box and extending to a point of connection with a component of said linkage, said point of connection when said wheels are centered being located on a line representing the axis of said pin joint and intersecting the axis of said universal connection, a second gear box supported by the frame of the vehicle at the side thereof whereat said one of said rails is located, a shaft extending from said second gear box to said first gear box, a universal joint in said shaft located on a line intersecting the axis of said connection between the radius rod and vehicle frame and that of said universal connection, and a steering shaft extending into said second gear box.

References Cited in the file of this patent
UNITED STATES PATENTS

| | | |
|---|---|---|
| 960,128 | Walker | May 31, 1910 |
| 1,308,289 | McKaig | July 1, 1919 |
| 2,692,778 | Stump | Oct. 26, 1954 |